April 4, 1972 D. E. KOONTZ ET AL 3,654,095

ELECTROLYTIC PRODUCTION OF MULTICOLORED PRINTS

Filed Aug. 6, 1970 2 Sheets-Sheet 1

INVENTORS D. E. KOONTZ
L. N. SCHOENBERG
D. R. TURNER
BY [signature]
ATTORNEY

United States Patent Office 3,654,095
Patented Apr. 4, 1972

3,654,095

ELECTROLYTIC PRODUCTION OF MULTICOLORED PRINTS

Donald Eldridge Koontz, Summit, Leonard Norman Schoenberg, North Plainfield, and Dennis Robert Turner, Chatham Township, Morris County, N.J., assignors to Bell Telephone Laboratories, Incorporated, Murray Hill, N.J.

Filed Aug. 6, 1970, Ser. No. 61,623
Int. Cl. B21h *1/20*
U.S. Cl. 204—2 20 Claims

ABSTRACT OF THE DISCLOSURE

A multicolored print is produced electrolytically from a modulated electrical signal by a scanning operation. Metallic anodes of as many different compositions as colors desired, are used together with one or more color producing reagents. Red, green, and blue images are produced using anodes containing copper, platinum and iron with a single ferrocyanide reagent or using anodes containing nickel, iron and copper with a combination of alpha-benzoin oxime, a dimethylglyoxime reagent, and a ferrocyanide reagent.

BACKGROUND OF THE INVENTION

(1) Field of the invention

Multicolored prints are produced from a modulated electrical signal.

(2) Description of the prior art

In the facsimile process by which transmitted black and white pictures are copied, silver ions are electrolytically deposited in a paper containing an electrolytic solution. This solution also contains a reducing agent which reduces the silver ions causing them to precipitate as fine particles of silver. These fine particles of silver form the black visual image on the white unprinted background. The modulation of the electric current through the writing head as it scans the paper, causes a modulation in the intensity of the black line produced. The totality of these modulated lines forms the final print. This is much the same waly as the electron beam of a cathode ray tube forms a television picture image.

Television images are produced in a full range of colors using the same scanning process, however, using three separate electron beams which control the output intensity of three different color phosphors. Since the human color sense is not analytic, a wide range of observed color is achieved by the control of the visual output of these three phosphors according to the well-known principles of additive color mixing. For example, the equal excitation of a red phosphor spot and a green phosphor spot will produce a yellow visual image if the spots are close enough so they cannot be resolved by the eye.

A number of different methods are known for producing a colored chemical from a colorless chemical. Some use has been made of such reactions in a manner analogous to the use of metallic silver in the black and white facsimile process referred to above, some examples can be found in U.S. Pat. Nos. 1,970,539 and 2,038,486. However, a full range electrolytic color print, analogous to a color television image, has not been achieved by prior workers in the art.

SUMMARY OF THE INVENTION

The simultaneous production of more than one pigment or "lake" from a single dye forming liquid has been found to be both possible and practical. This permits the electrolytic production of a print in more than one color from a modulated electrical signal such as can be derived from a telephone line or from within a computer. Thus, full range color prints or prints including separate regions of individual colors can be produced. Since the widest range of color by an additive process is derived from the three colors red, green, and blue, the exemplary developments reported below have concentrated on a three color process. In such a process, the writing head must contain anode electrodes made of the same number of different metals as the different colors desired. These metals, after being electrolytically ionized and deposited in the printing sheet (usually a paper) in concentrations varying with the modulated electric current flow, react with a dye-forming liquid containing one or more inchoate dyestuffs in the recording sheet to form the colored image. The dye-forming liquid can be present in the recording sheet during the electrolytic writing or introduced subsequently. The disclosed systems allow the formation of a color print in the same order of time as the common black and white facsimile systems.

DETAILED DESCRIPTION OF THE INVENTION

Additive color mixing

Figure 4:
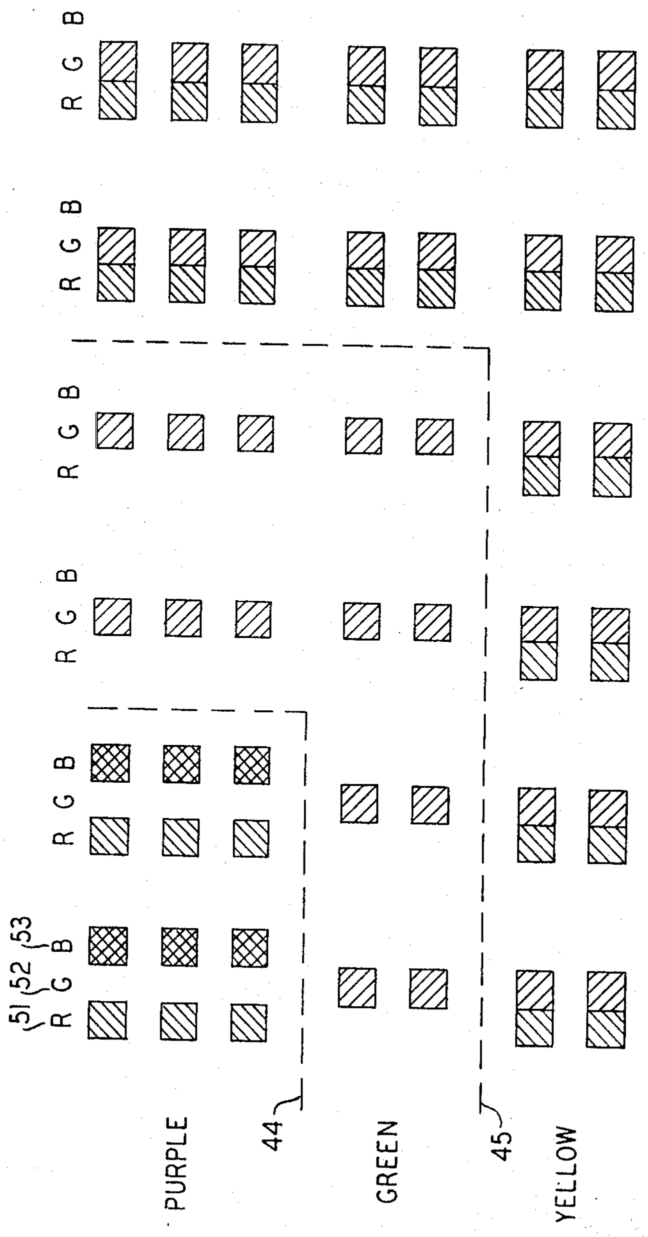
FIG. 4 is an exemplary section of a multicolored image.

FIG. 4 shows how a multicolored image can be produced using spots of the three colors red 51, green 52, and blue 53. According to the well-known principles of additive color mixing (University Physics, 2nd ed., F. W. Sears and M. W. Zemansky 1955, Addison-Wesley) the area to the left of the dotted line 44 containing red and blue spots has the visual appearance of a purple. The area between the dashed lines 44 and 45 contains only green spots and so appears green. The area below and to the right of dashed lines 45 is printed with red and green spots thus appears yellow. The exact color produced depends upon the relative intensity of the various spots which, in turn, depends upon the total charge flow during the electrolytic writing of each spot.

In order to realize the physiological effect on the eye of additive color mixing, it is necessary that the individual spots be close enough together so that they cannot be distinguished from one another (resolved) and the colors seen separately. A line of spots which are 0.004 inch in diameter and are spaced 0.004 inch apart cannot be resolved by the human eye at a normal reading distance and appears as a solid line. As the spacing is increased granularity becomes observable. Thus 0.004 inch is a preferred spacing between spots although 0.006 inch between spots is also acceptable, although somewhat less preferred, and a spacing of 0.010 inch is useful for pictures to be viewed from greater than normal reading distances.

For some purposes, it may be desirable to use different colors than red, green and blue although this leads to a narrower color range. As few as two colors may be used and as many as desired. Use can be made of a white printing sheet or clear areas in a transparent printing sheet or clear areas in a transparent recording sheet to produce a white area in the print. The use of an electrode to produce a black mark is often desirable as are black inks in full range color ink printing processes. The visual effect of the use of a nonwhite printing sheet can be determined by one skilled in the art by standard analytical techniques. The use of such a nonwhite sheet does not depart from the spirit and scope of the invention nor does the use of an inchoate dyestuff which is itself colored and imparts a general background color to the printing sheet.

Electrolytic color printing

Figure 1:
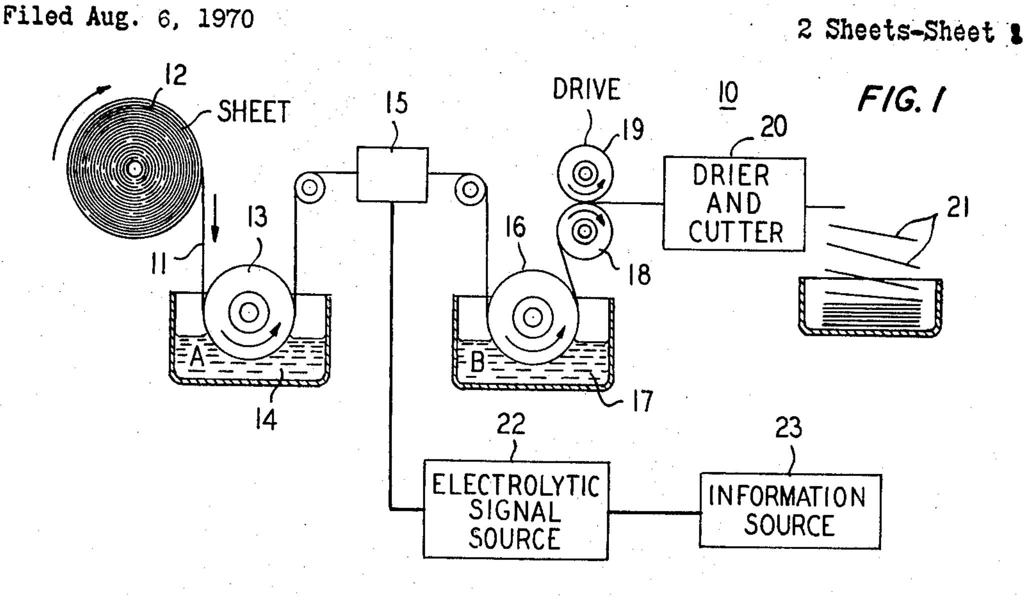
FIG. 1 is a schematic view of an exemplary apparatus for color print production.

FIG. 1 shows, in a schematic form, the various parts which may be included in a color printing apparatus. The printing sheet 11 fed from the roll 12 can be preimpregnated with the electrolytic solution or it can pass through a container of electrolytic solution 14 while passing around roller 13. The colorless inchoate dyestuff can be present in either the rolled sheet 12, in the electrolytic solution 14, or in a separate solution 17 either prior or subsequent to the passage through the writing head 15. Writing is accomplished by varying the electric current which passes through the writing head 15. The modulated electrical signal which controls the writing head 15 and produces the image comes from some source of information 23 which can be remote or local, passes to the local electrolytic signal source 22 and then to the writing head 15. Sources 22 and 23 can be combined into a single entity. The sheet 11 then goes either directly through the drive wheels 18 and 19 to the dryer and cutter 20 or passes around roller 16 and through solution 17 which may contain the inchoate dyestuff. It is possible to dry the printing sheet before the introduction of the inchoate dyestuff and so preserve the image in a latent form for subsequent development by introduction of the inchoate dyestuff.

Figure 2:
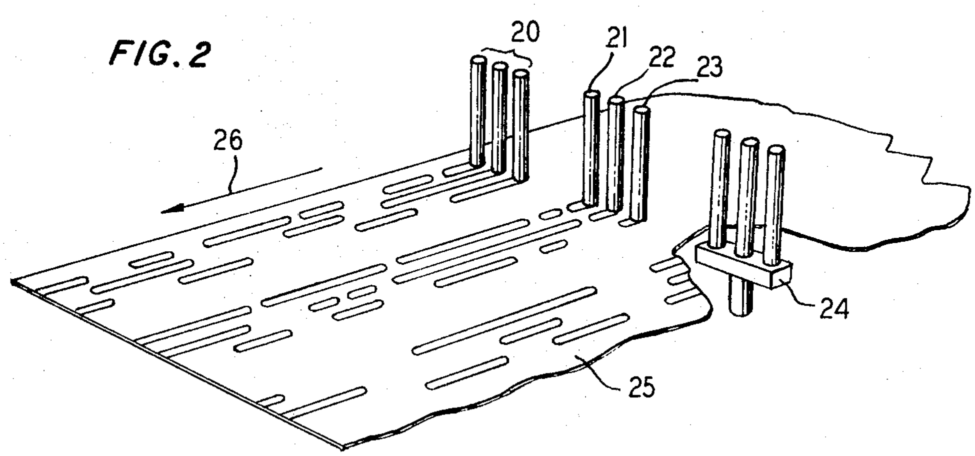
FIG. 2 is a perspective view of a portion of an exemplary writing head in which an array of electrode groups produces a multicolored image.

FIG. 2 shows a portion of an exemplary writing head which includes an array of electrode groups 20 being excited by amplitude modulated pulses. Each group, here, consists of three anodes 21, 22, 23 and a common cathode 24. The three anodes 21, 22, 23 may control the three primary colors, red, green and blue or two colors (one color being produced by two of the anodes) or two colors plus black. A single cathode common to the group may be used, as shown 24 or an individual cathode corresponding to each anode, or even a single cathode common to several or all of the members of the array of electrode groups. FIG. 2 also shows a printing sheet 25 which is being transported in the direction of the arrow 26 roughly perpendicular to the array of electrode groups 20. Modulation 27 of the three colors in order to produce a multicolored image is shown.

Figure 3:
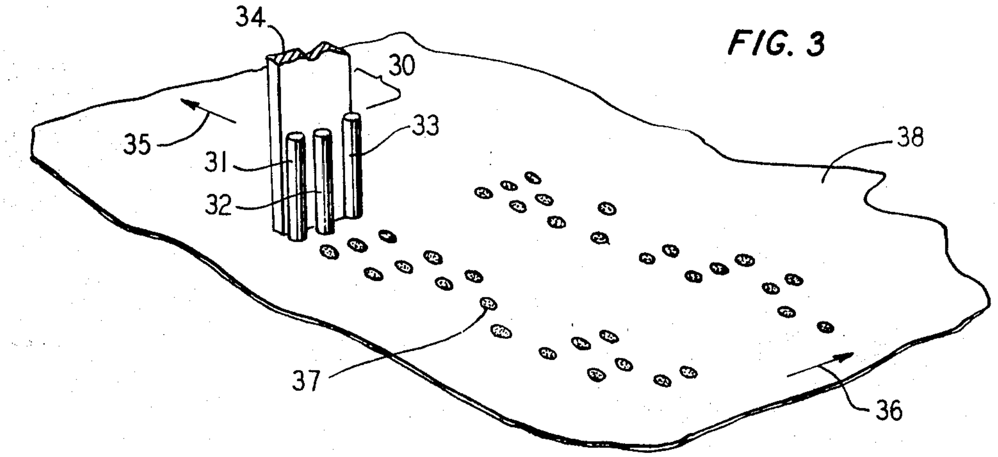
FIG. 3 is a perspective view of a writing head in which one electrode group scans back and forth across the paper as the paper moves forward.

FIG. 3 illustrates another of the many possible writing head configurations. In this configuration a single electrode group 30 is used which includes three anodes 31, 32, 33 and a common cathode 34 situated on the same side of the printing sheet 38 as the anodes 31, 32, 33. This electrode group 30 scans across the paper 38 in the direction of arrow 35 as the paper 38 proceeds in the roughly perpendicular direction (the direction of the arrow 36). Again the modulation of the various color spots 37 is illustrated. This figure once again illustrated the use of three anodes which may control the three colors. However, one skilled in the art could readily envision the use of as few as two or more than three anodes to fulfill varying device requirements.

The exemplary writing heads shown in FIGS. 2 and 3 maintain the different anodes of each electrode group in close registration as is necessary for color mixing in a full range color process. However, if it is desired to print the different colors individually this close registration is not required and the different anodes of the group can be mounted separately. Another embodiment, which is included within the spirit and scope of the invention, includes a two dimensional array of electrode groups which prints an area of the printing sheet with no relative mechanical motion. In this case the scanning is accomplished electronically by sequentially exciting exciting the electrode groups of the array.

Examples

Table 1 contains several examples of the various chemical reactions which can be used to form multicolored prints. One requirement in the selection of these systems is that the metal ion producing one color must react only very slowly with the reagents producing the other colors in those systems containing more than one reagent.

TABLE 1

| Reagent | Metal | Color |
|---|---|---|
| Rubeanic acid | Nickel | Blue. |
| | Platinum | Red. |
| | Copper | Green. |
| | Cobalt | Yellow-brown. |
| Alizarin | Aluminum | Red. |
| | Uranium | Blue. |
| | Zirconium | Red-violet. |
| Zinc sulphide | Copper-silver | Black. |
| | Cadmium | Yellow. |
| Rho-nitrosodiphenylamine | Palladium | Reddish-purple. |
| Ammonium mercuric thiocyanate | Zinc | Blue. |
| Alpha-nitroso-beta-naphthol | Cobalt | Red-brown. |
| Benzidine acetate | Osmium | Blue-green. |
| Sodium rhodizonate | Lead | Blue. |
| Potassium Chromithiocyanate | Bismuth | Brick-red. |
| Pyrocatechol | Iron | Black. |

In somewhat more detail the following additional examples are illustrative of three color (red, green and blue) processes, since these make possible the widest gamut of color reproduction. It is obvious, however, that in either of these processes one could select any two colors and achieve a more limited yet still multicolored print. In the first example anode electrodes containing iron, copper and platinum are used to introduce $Fe^{3+}$, $Cu^{2+}$ and $Pt^{2+}$ ions into the recording sheet which subsequently react with the colorless inchoate dyestuff sodium ferrocyanide in order to produce, respectively, a blue, a red and a green dyestuff or lake, i.e., according to the following chemical reactions:

$$\begin{array}{lcc} Fe^{3+} & & NaFe[Fe(CN)_6] \\ & & \text{BLUE} \\ Cu^{2+} + Na_4[Fe(CN)_6] & \rightarrow & Na_2Cu[Fe(CN)_6] \\ & & \text{BRICK RED} \\ Pt^{2+} & & Na_2Pt[Fe(CN)_6] \\ & & \text{GREEN} \end{array}$$

Here the electrolyte is an aqueous solution containing one weight percent potassium chloride. The sodium ferrocyanide is present in 2 weight percent in either the electrolytic solution or in a subsequent development solution.

Red, blue and green marks are obtained using nickel, iron and copper anodes by preparing the recording sheet, for example, in the following manner:

(1) immerse in 2% by weight alpha-benzoin oxime in alcohol.
(2) dry.
(3) immerse in 0.5 M acetic acid.
(4) water rinse.
(5) immerse in 0.3 M sodium carbonate plus 0.1 M sodium nitrate.
(6) immerse in 2% by weight sodium dimethylglyoxime plus 2% sodium chloride.
(7) immerse in 0.6% sodium ferrocyanide plus 0.4% potassium chloride.

The color producing chemical reactions are:

$$Ni^{2+} + 2C_4H_8N_2O_2 \longrightarrow Ni(C_4H_7N_2O_2)_2 + 2H^+$$
RED $$Fe^{3+} + Na_4[Fe(CN)_6] \longrightarrow NaFe[Fe(CN)_6] + 3Na^+$$
BLUE $$Cu^{2+} + (C_{14}H_{11}NO_2)^{2-} \longrightarrow Cu(C_{14}H_{11}NO_2)$$
GREEN Step 3 above, is beneficial in intensifying the green reaction but is not necessary. The presence of the chloride ion helps to prevent the passivation of the nickel electrode.

What is claimed is:

1. Apparatus for the electrolytic production of a print in accordance with a modulated electrical signal the said apparatus comprising a transporting means and a writing means which said transporting means comprises a driving means for causing relative motion between the said writing means and a printing sheet as the said writing means electrolytically introduces metal atoms into the said printing sheet which said metal atoms are capable of reacting with a dye forming liquid in order to produce color characterized in that the said writing means comprises at least one electrode group which said electrode group comprises at least one cathode electrode and at least two anode electrodes which said anode electrodes differ from one another in composition and are capable of electrolytically producing at least two different species of the said metallic atoms which said at least two different species are capable of reacting with the said dye forming liquid in order to produce at least two differently colored dyestuffs thus a print in at least two colors.

2. Apparatus of claim 1 in which the said dye forming liquid is contained within the said printing sheet.

3. Apparatus of claim 1 in which the said transporting means comprises wetting means located at a position subsequent to the said writing mechanism which said wetting means is capable of causing the said printing sheet to contact the said dye forming liquid.

4. Apparatus of claim 1 in which the said dye forming liquid comprises one inchoate dyestuff capable of being converted to at least two of said colored dyestuffs upon combination with atoms of at least two of said at least two different species.

5. Apparatus of claim 4 in which the said dye forming liquid comprises one said inchoate dyestuff capable of being converted to three said colored dyestuffs upon combination with atoms of three of said at least two different species.

6. Apparatus of claim 5 in which the said at least two different species are copper, platinum and iron and the said one inchoate dyestuff is a compound containing the ferrocyanide group.

7. Apparatus of claim 1 in which the said dye forming liquid comprises at least two inchoate dyestuffs each capable of being converted to at least one of the said colored dyestuffs upon combination with atoms of at least one of the said at least two different species.

8. Apparatus of claim 7 in which the said at least two different species are nickel, iron, and copper and the said dye forming liquid comprises the three inchoate dyestuffs alpha-benzoin oxime, a compound containing the dimethylglyoxime group and a compound containing the ferrocyanide group.

9. Apparatus of claim 1 in which the spacing between each said anode of each said electrode group and the adjacent said anode of the same said electrode groups is less than 0.01 inch.

10. Apparatus of claim 1 in which the said transporting means comprises means for moving one said electrode group back and forth across the printing sheet.

11. Apparatus of claim 1 comprising a linear array of more than one of the said electrode groups.

12. Method for the electrolytic production of a print in accordance with a modulated electrical signal comprising the electrolytic introduction of metal atoms into a printing sheet and the combination of the said metal atoms with a dye forming liquid containing inchoate dyestuff groups which said combination produces color characterized in that the said metal atoms comprise at least two species and the said combination produces at least two differently colored dyestuffs thus a print in at least two colors.

13. Method of claim 12 in which the said metal atoms are deposited in rows of spots of varying density.

14. Method of claim 13 in which the spacing between the said rows is less than 0.01 inch.

15. Method of claim 12 in which the said dye forming liquid is present in the said printing sheet during the said electrolytic introduction.

16. Method of claim 12 in which the said dye forming liquid is caused to contact the said printing sheet subsequent to the said electrolytic introduction.

17. Method of claim 12 in which the said dye forming liquid comprises only one species of the said inchoate dyestuff groups.

18. Method of claim 17 in which the said one species of the said inchoate dyestuff groups is the ferrocyanide group and the said metal atoms comprise copper, platinum and iron.

19. Method of claim 12 in which the said dye forming liquid comprises at least two species of the said inchoate dyestuff groups.

20. Method of claim 19 in which the said at least two species of the said inchoate dyestuff groups are alpha-benzoin oxime, a compound containing the dimethylglyoxime group and a compound containing the ferrocyanide group, and the said metal atoms comprise nickel, iron and copper.

References Cited

UNITED STATES PATENTS

| | | | |
|---|---|---|---|
| 1,970,539 | 8/1934 | Bausch | 204—2 |
| 2,035,474 | 3/1936 | Hay | 204—2 |
| 2,038,486 | 4/1936 | Glas | 204—2 |
| 2,485,678 | 10/1949 | Tribble | 204—224 |
| 3,301,772 | 1/1967 | Viro | 204—2 |

JOHN H. MACK, Primary Examiner

T. TUFARIELLO, Assistant Examiner

U.S. Cl. X.R.

346—74 E